(12) United States Patent
Yadav et al.

(10) Patent No.: US 9,544,185 B1
(45) Date of Patent: Jan. 10, 2017

(54) HARDWARE BASED FAST CONVERGENCE FOR NETWORK FAILURES

(71) Applicant: Insieme Networks, Inc., San Jose, CA (US)

(72) Inventors: Navindra Yadav, Cupertino, CA (US); Ayaskant Pani, Fremont, CA (US); Kit Chiu Chu, Fremont, CA (US)

(73) Assignee: Cisco Technology, Inc., San Jose, CA (US)

( * ) Notice: Subject to any disclaimer, the term of this patent is extended or adjusted under 35 U.S.C. 154(b) by 105 days.

(21) Appl. No.: 14/086,803

(22) Filed: Nov. 21, 2013

Related U.S. Application Data

(60) Provisional application No. 61/900,214, filed on Nov. 5, 2013.

(51) Int. Cl.
*H04L 12/26* (2006.01)
*H04L 12/28* (2006.01)
*H04L 12/24* (2006.01)

(52) U.S. Cl.
CPC ................................. *H04L 41/0668* (2013.01)

(58) Field of Classification Search
None
See application file for complete search history.

(56) References Cited

U.S. PATENT DOCUMENTS

| | | | |
|---|---|---|---|
| 7,539,131 B2* | 5/2009 | Shen | 370/217 |
| 7,580,409 B1* | 8/2009 | Swenson et al. | 370/392 |
| 2003/0058860 A1* | 3/2003 | Kunze et al. | 370/392 |
| 2005/0073958 A1* | 4/2005 | Atlas et al. | 370/238 |
| 2007/0091795 A1* | 4/2007 | Bonaventure et al. | 370/228 |
| 2008/0259925 A1* | 10/2008 | Droms et al. | 370/392 |
| 2010/0260197 A1* | 10/2010 | Martin et al. | 370/408 |
| 2012/0195233 A1* | 8/2012 | Wang et al. | 370/258 |

OTHER PUBLICATIONS

Aslam, F. et. al, "NPP: A Facility Based Computation Framework for Restoration Routing Using Aggregate Link Usage Information," Proceedings of QoS-IP: quality of service in multiservice IP network, Feb. 2005, pp. 150-163.

Kodialam, M. et. al, "Dynamic Routing of Locally Restorable Bandwidth Guaranteed Tunnels using Aggregated Link Usage Information," Proceedings of IEEE INFOCOM, 2001, vol. 1, pp. 376-385.

(Continued)

*Primary Examiner* — Chi H Pham
*Assistant Examiner* — Soon-Dong D Hyun
(74) *Attorney, Agent, or Firm* — Weaver Austin Villeneuve & Sampson LLP

(57) ABSTRACT

Certain features required for routing decisions are provided by hardware. For example, the router logic may be modified to provide multiple alternative paths for a link. In some implementations, hardware autonomously detects a link or port failure and routes on an alternate link without software intervention. In one approach, the router stores the alternate paths in the data plane. In some implementations, network devices are also configured for active loop avoidance and detection is implemented so that packets never loop due to multiple failures that occur close to each other.

44 Claims, 11 Drawing Sheets

(56) References Cited

OTHER PUBLICATIONS

Li, L. et. al, "Routing Bandwidth Guaranteed Paths with Local Restoration in Label Switched Networks," IEEE Journal on Selected Areas in Communications, Feb. 7, 2005, vol. 23, No. 2, pp. 437-449.

Pan, P. et. al, "Fast Reroute Extensions to RSVP-TE for LSP Tunnels," RFC-4090. May 2005, pp. 1-38.

Raza, S. et. al, "Online routing of bandwidth guaranteed paths with local restoration using optimized aggregate usage information," IEEE-ICC '05 Communications, May 2005, vol. 1, pp. 201-207.

\* cited by examiner

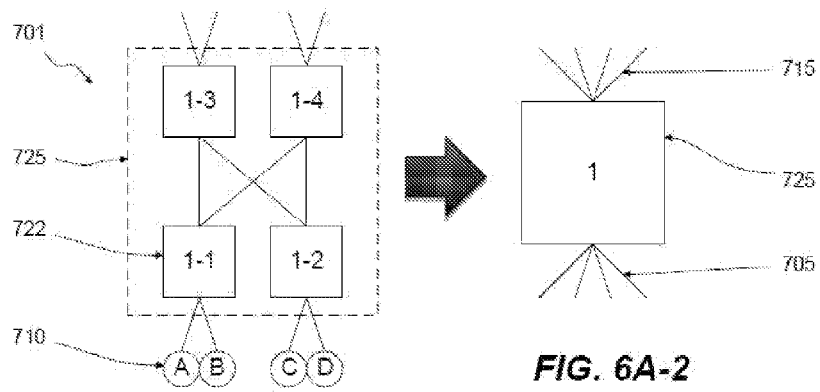
FIG. 6A-1
FIG. 6A-2
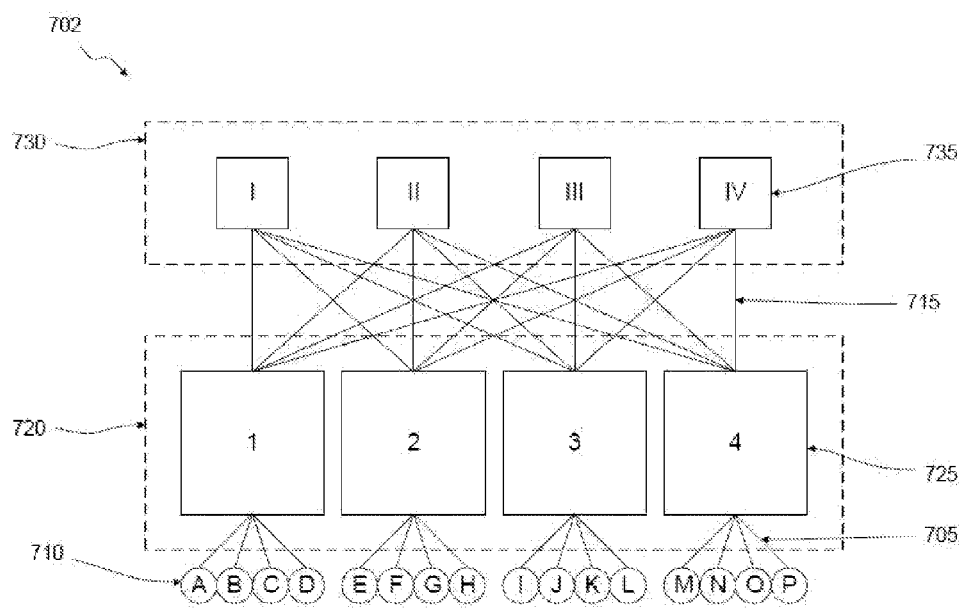
FIG. 6B

HARDWARE BASED FAST CONVERGENCE FOR NETWORK FAILURES

CROSS REFERENCE TO RELATED APPLICATION

This application claims benefit of U.S. Provisional Patent Application No. 61/900,214, filed Nov. 5, 2013, entitled "HARDWARE BASED FAST CONVERGENCE FOR NETWORK FAILURES", which application is incorporated by reference herein in its entirety and for all purposes.

BACKGROUND

In a conventional network, each router maintains a graph representing the router's network. A router in a data center may, for example, maintain a graph depicting all nodes and links in the data center and possibly some nodes outside the data center. A router's software uses the graph to calculate the shortest paths to network destinations and to maintain a forwarding table identifying router interfaces for packets addressed to the network destinations. A typical router also generates and sends control packets to notify other routers to of updated link states and thereby allow the other routers to update their graphs when link states change.

SUMMARY

Certain features required for routing decisions are provided by hardware. For example, the router logic may be modified to provide multiple alternative paths for a link. In some implementations, hardware autonomously detects a link or port failure and routes on an alternate link without software intervention. In one approach, the router stores the alternate paths in the data plane. In some implementations, network devices are also configured for active loop avoidance and detection is implemented so that packets never loop due to multiple failures that occur close to each other.

One aspect of the disclosure concerns a network device that may be characterized by the following features: (a) a plurality of interfaces for coupling with network links; and (b) a processor with hardware logic configured to (i) determine that a link to an interface is not functioning properly, (ii) identify interfaces in a forwarding table containing a list of primary interfaces and alternate interfaces for reaching network addresses, and (iii) identify in the forwarding table an alternate interface for reaching a network address when a primary interface for said network address is coupled to a link identified as not functioning properly. In some embodiments, the hardware logic is further configured to reroute a packet, in response to a detected link failure, on an alternate interface within a period of about 1 millisecond or less. In some implementations, the processor is an application specific integrated circuit or a digital signal processor. In some embodiments, the processor contains memory configured to store the forwarding table. As an example, the memory may be a content addressable memory.

In some implementations, the hardware logic is further configured to determine whether a packet identified for forwarding on an alternate interface listed in the forwarding table has a reroute flag set, and, if so, dropping said packet. In such implementations, the hardware logic may be further configured to set said reroute flag in the packet when the packet does not have a previously set reroute flag. As a further example, the hardware logic may be further configured to (i) instruct the network device to send a packet on said alternate interface; (ii) determine that the packet does not have a reroute flag set; and (iii) set said reroute flag in the packet.

In certain embodiments, the network device is configured as a spine node on a network having a multi-rooted tree topology. In such embodiments, the program logic may be configured to encapsulate and de-encapsulate packets sent on an overlay of the network. VxLAN is an example of such encapsulation.

In some implementations, the hardware logic is configured to determine, look up, and identify as recited in claim 1 without any software intervention. In certain embodiments, the network device further comprises software configured to (i) maintain an updated graph of a network containing the network device, and (ii) recalculate entries for the forwarding table from said graph. In some cases, the software is further configured to send control packets to other network devices, wherein said control packets contain reachability information consistent with one or more failed links on the network device. In some devices, the hardware logic is configured to reroute a packet on an alternate interface before the software updates the graph and/or recalculates entries for the forwarding table in response to a detected link failure.

Another aspect of the disclosure concerns a network containing a plurality of leaf and spine network devices connected in a multi-rooted tree topology. At least some of the spine network devices include: (a) a plurality of interfaces for coupling with network links; and (b) a processor with hardware logic configured to (i) determine that links to the interfaces are not functioning properly, (ii) look up interfaces in a forwarding table containing a list of primary interfaces and alternate interfaces for reaching network addresses, and (iii) identify in the forwarding table an alternate interface for reaching a network address when a primary interface for said network address coupled to a link identified as not functioning properly. Each of the leaf network devices may include a plurality of interfaces for coupling with spine network devices and end devices. The leaf network devices may include logic configured to (i) determine whether a packet is addressed to the leaf network device or to an end device attached to the leaf network device, and (ii) if not, forward the packet to a spine network device that is not the spine network device that sent the packet to the leaf network device. In various embodiments, any one or more of the spine network devices contains one or more of the device features described above.

Another aspect of the disclosure concerns a method of rerouting a packet when a link to a network device has failed. The network device contains a plurality of interfaces for coupling with network links, and a processor with hardware logic. The method may be characterized by the following operations: (a) determining that a link to an interface is not functioning properly, (b) looking up interfaces in a forwarding table containing a list of primary interfaces and alternate interfaces for reaching network addresses, and (c) identifying in the forwarding table an alternate interface for reaching a network address when a primary interface for said network address is coupled to a link identified as not functioning properly. Typically, at least (b) and (c) are performed by the hardware logic. In some cases, the method reroutes a packet, in response to a detected link failure, on an alternate interface within a period of about 1 millisecond or less.

In certain implementations, the processor is an application specific integrated circuit or a digital signal processor. In some examples, the processor contains memory configured to store the forwarding table. The memory may be content addressable memory.

In some cases, the method additionally determine whether a packet identified for forwarding on an alternate interface listed in the forwarding table has a reroute flag set, and, if so, drop the packet. In such cases, the method may additionally set the reroute flag in the packet when the packet does not have a previously set reroute flag. In some methods, the following operations are performed: (i) instructing the network device to send a packet on said alternate interface; (ii) determining that the packet does not have a reroute flag set; and (iii) setting said reroute flag in the packet.

In certain embodiments, the method is implemented on a spine node of a network having a multi-rooted tree topology. In some embodiments, the method additionally includes encapsulating and de-encapsulating packets sent on an overlay of the network. In some embodiments, the method involves processes VxLAN encapsulation.

In some implementations, the method further includes: (i) maintaining an updated graph of a network containing the network device, and (ii) recalculating entries for the forwarding table from said graph. In some implementations, the method further includes sending control packets to other network devices, wherein said control packets contain reachability information consistent with one or more failed links on the network device. In some implementations, the method further includes rerouting a packet on an alternate interface before the network device updates the graph and/or recalculates entries for the forwarding table in response to a detected link failure. In certain embodiments, the hardware logic is configured to determine, look up, and identify as recited above without any software intervention.

These and other features will be described below with reference to the drawings.

BRIEF DESCRIPTION OF THE DRAWINGS

FIGS. 4, 5 and 6A-1, 6A-2 and 6B present examples of network topologies suitable for use with the disclosed embodiments.

DETAILED DESCRIPTION

Introduction

Figure 1:
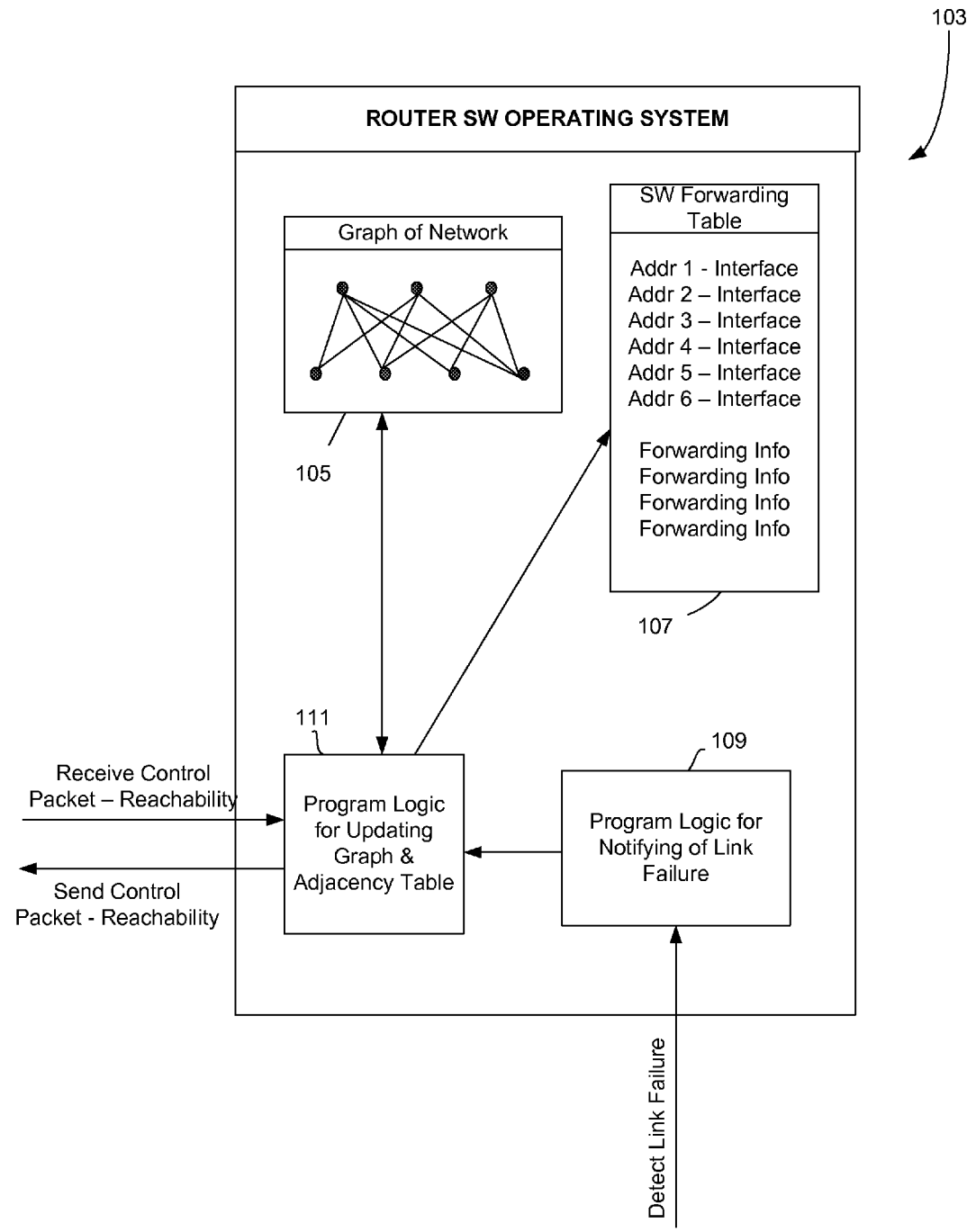
FIG. 1 is a block diagram showing some relevant components of a conventional router in which convergence after link failure is accomplished using software.

In conventional link state routing protocols, each router maintains a graph of the entire network and uses that graph to calculate adjacencies. Adjacencies tell the router which interface to use for a given destination address on a packet. The router uses a shortest path optimization routine in order to calculate appropriate adjacencies for groups of destination addresses.

When a conventional router detects a link failure, it modifies its internal graph, recalculates adjacencies, and notifies its peer network devices of the link failure. Each of the peer network devices receiving this notification must then likewise update its local graph of the network and recalculate adjacencies. The communications between the peers that a link has failed is done via control packets generated using software on the control plane of the routers. The process by which the routers adjust their graphs and adjacencies is called convergence. Conventionally, convergence over the entire network is implemented entirely in software. As a consequence, the convergence time can be quite long, often on the order of 500 milliseconds or longer.

The software responsible for these operations may be centralized on a network node or distributed over the network. In a highly redundant network topology such as a multi-rooted tree topology, when a node or link fails the software control plane (distributed or centralized) must recalculate the alternate paths that traffic can take to destinations. This calculation is in the critical path and traffic forwarding is disrupted during the recalculation.

In certain embodiments disclosed herein, features of the software required for routing decisions are replaced by hardware. In some embodiments, the router logic is modified to provide multiple alternative paths for a link. In some implementations, hardware autonomously detects a link or port failure and routes on an alternate link without software intervention. In one approach, the router stores the alternate paths in the data plane. In some implementations, network devices are also configured for active loop avoidance and detection is implemented so that packets never loop due to multiple failures that occur close to each other.

The disclosed embodiments enable the hardware react quickly to a topology failure when a solution exists. By contrast, software takes a long time in processing and recalculating the topology. The downtime may be less than about 150 micro seconds which is about a 100,000 to million times faster than the software alternative today.

Topologies

The disclosed embodiments can be deployed on many different types of layer 3 network devices and networks. As mentioned, highly redundant network topologies are particularly favorable environments for implementation of the disclosed hardware rerouting methods. Examples of such topologies include multi-rooted tree networks, full mesh networks, multi-layer leaf-spine networks, and the like. A multi-rooted tree topology is described below. Other types of networks can also profit from such methods. For example, the methods can be deployed on access-aggregation-core networks.

Calculating alternative forwarding paths takes a long time in dense network topologies because the time required to execute shortest path algorithms is a product of the number of network nodes and the number of edges in the graph. In multi-rooted tree topologies in data centers both the dimensions are typically high. In addition to the graph calculation time, the number of updates that need to be exchanged in a link state algorithm is high. Both these factors result in potentially unacceptably long outages after link failure.

SW Implementation

FIG. 1 illustrates some of the logic and software components found in a typical router 103. Many components typically provided in a normal router are not shown. The software components shown in FIG. 1 assist in convergence after a link failure. As depicted, the software and associated routing resources include a graph of the network 105 and the forwarding table 107. The software uses these elements to determine which interface should be used for forwarding packets having particular destination addresses.

As depicted in FIG. 1, router software 103 includes program logic 109 for notifying other router components of a link failure. In various embodiments, link failure detection is performed at the hardware level and communicated to program logic 109. Upon receiving notification of a link failure, logic block 109 conveys information about the failure to program logic 111. Program logic 111 is responsible for various operations associated with convergence after link failure. For example, as shown in FIG. 1, program logic 111 is responsible for maintaining a current graph of the network. Thus, when block 111 learns that a link connected to a router has failed, it will update graph 105 by removing a connection between the two nodes connected by the failed link.

Additionally, program logic 111 may send control packets with reachability information to other network devices. It may do this, for example, when it learns of a local link failure from logic block 109. Network devices receiving control packet issued by logic 111 receive information necessary to update their local graphs and thereby account for the link failure on the router of logic 111. The reachability information in control packets specifies which nodes are reachable on which links.

Program logic 111 may learn of link failures on other routers by receiving control packets from other network devices. If a received control packet indicates that a link between two other network devices is down, logic block 111 will update graph 105 to reflect this change.

Another role of program logic 111 is to maintain updated entries (adjacencies) in forwarding table 107. As shown, the forwarding table includes a number of addresses and associated interfaces for those addresses. These user interfaces are provided on the network device running software 103. Logic block 111 uses information contained in the current version of network graph 105 to calculate shortest path information to particular network addresses. Using the calculated shortest path information, program logic 111 updates table 107.

As explained above, the process of convergence may require on the order of hundreds of milliseconds when implemented using software such as depicted in FIG. 1. Convergence requires updating graph 105, calculating new routes, and updating the forwarding table 107 with information for the new routes.

HW Implementation

As used herein, the concept of a link failure includes failure of any link attached to any port on a router under consideration. The concept extends to failure of other hardware components associated with a link such as failure of a router interface attached to a link or the link itself. Typically, a network device is configured to detect a link failure. Such detection can be accomplished by any of a number of techniques, many of them conventional, and typically they are implemented in hardware. For example, a link failure may be detected by a discontinuance of receipt of encoded communications on a serial port connected to the link, loss of optical signal, and/or loss of electrical signal level. If the link failure is in only one direction of a link, notification link failure may come about from a communication sent from a node on the opposite end of the link via the part of the link in the direction that still works.

Figure 2:
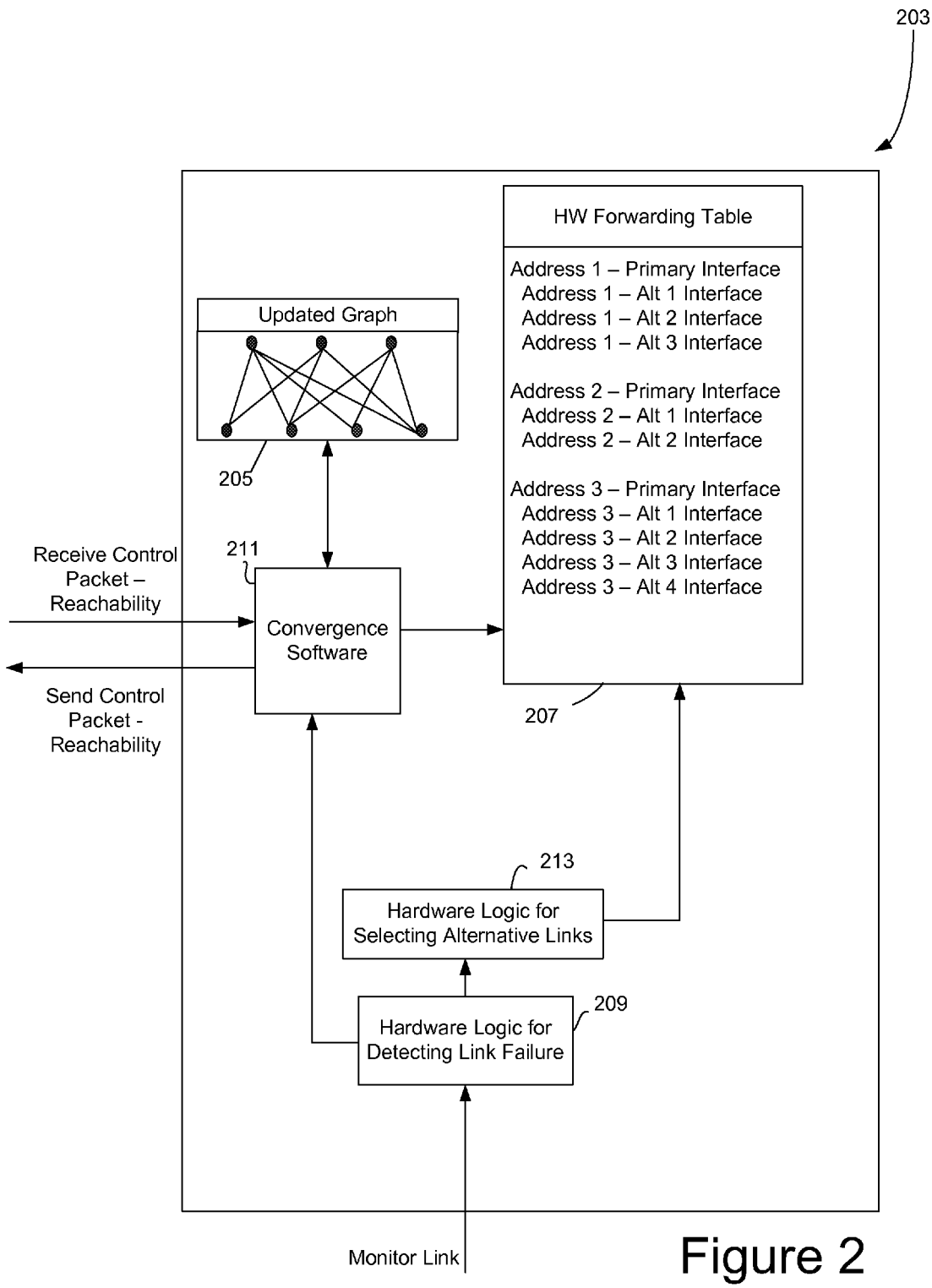
FIG. 2 is a block diagram depicting some relevant components of a router that employs hardware logic to make routing decisions shortly after a link failure but prior to convergence by software.

FIG. 2 presents one implementation of the rerouting features of this disclosure. As shown, the rerouting features of a router 203 include a graph of the network 205 and forwarding table 207. In most regards, graph 205 may be considered as identical to graph 105 shown in FIG. 1. However, the forwarding table 207 in router 203 is notably different from the forwarding table 107 in router 103 of FIG. 1. While both forwarding tables serve essentially the same function—identifying interfaces on the router for forwarding packets having known destination addresses—the forwarding table 107 of FIG. 1 has only a single interface identified for each address (or address group). Forwarding table 207, by contrast, contains a primary interface and one or more alternate interfaces for at least one of the addresses (or address groups) identified in the table. In the depicted example, an "Address 1" has an associated primary interface and three alternate interfaces. An "Address 2" has a primary interface and two alternate interfaces. An "Address 3" has a primary interface and four alternate interfaces. The hardware in router 203 is designed to immediately identify one of the alternate interfaces when the primary interface for the associated address is unavailable due to a broken link or other reason.

A program logic block 211 contains convergence logic (implemented as software and/or hardware) responsible for updating the graph 205 and the forwarding table 207 when a link or other element associated with an interface fails. Convergence logic 211 takes these actions independently of hardware operations which choose an alternate interface when a link fails. In other words, the hardware addressing a link failure chooses an alternate interface and ensures that the packet in question is forwarded on such alternate interface before convergence logic 211 undertakes its responsibility to update graph 205 and forwarding table 207.

In the depicted embodiment, convergence logic 211 assumes certain functions, and perhaps all functions, of program logic 111 in the design of FIG. 1. Thus, for example, convergence logic 211 is responsible for sending control packets indicating link failures associated with router 203 and processing control packets from other network devices indicating link failures on such other network devices.

In the depicted embodiment, the router 203 includes a hardware logic block 209 for detecting a link failure. The hardware monitors links and determines when failures occur, at which times it communicates link failures to another hardware logic block (block 213) for selecting alternate links. Hardware block 213 is responsible for interfacing with forwarding table 207 and quickly selecting an alternate interface when the primary interface associated with a given address is down due to a link failure or otherwise.

Upon detecting a link failure, hardware block 209 additionally communicates enough information to convergence logic 211, which, as explained, takes appropriate steps to update graph 205 and forwarding table 207. Of course, part of the process of updating forwarding table 207 is to replace primary interfaces having failed links and identify appropriate alternate interfaces for each of one or more addresses listed in the forwarding table. As an example, a forwarding table in an overlay network may have addresses for only overlay address, which may number on order of thousands of addresses (e.g., 4000). By contrast, a forwarding table for a network device in a conventional data center may hold millions of host addresses.

Different Implementations in Leaf and Spine.

In embodiments where different types of network devices are implemented on a network topology, different rerouting procedures may be configured on the different device types. For example in a multi-rooted tree network, spine and leaf devices may address link failures in different ways. In one example, the spine devices maintain a full graph of the network and have mechanisms for checking against multiple bounces. In one implementation, spine network devices include hardware logic for (i) selecting an alternative link when an intended link is down, and (ii) disallowing further transmission of packets that have been received by the spine more than once. The leaf devices by contrast may simply keep track of which links are down and eliminate them from the list of available links for directing traffic to spine nodes. In some embodiments, the leaf devices provide a mechanism for not sending a packet back to the spine from which it was received.

Examples Illustrating Aspects of HW Link Rerouting.

Each of FIGS. 3A through 3F assumes that a packet is created at an end node A and addressed to another end node B. Node A is attached to one network device, while node B is attached to a different network device. In the depicted examples, the network devices are provided on a multi-rooted tree network 303 that may be understood as having leaf network nodes at one tier and spine network nodes at a different tier. The leaf-spine multi-rooted tree topology is described in greater detail later in this document. For purposes of describing FIGS. 3A-F, it is sufficient to understand that end devices are attached to leaf devices and that the network topology is divided into a spine tier 305 and the leaf tier 307.

Leaf and spine network devices are connected to one another by high-speed links. Any one of these links may fail at any time. When this occurs, a leaf or spine network device designed or configured as described herein will take appropriate steps to send the packet on an alternate interface (link) as necessary.

Figure 3A:
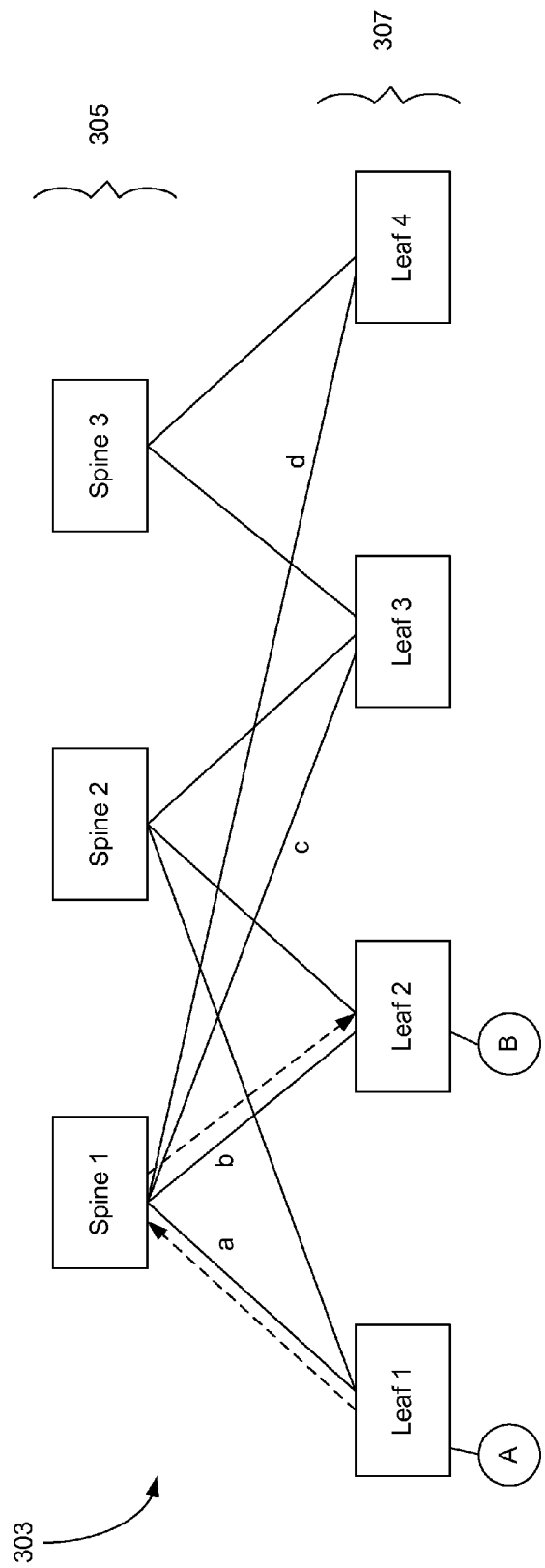
FIG. 3A is a diagram of a multi-rooted tree network topology in which a packet is created at a source node A and addressed to a source node B and the packet travels over the shortest path in which there no link failures.

In the embodiment depicted in FIG. 3A, all relevant links (i.e., those links connecting the network devices to which end nodes A and B are attached) are available, and the packet is successfully forwarded from end node A to end node B on the shortest path in network 303. This path uses a link a linking leaf device 1 to spine device 1, and a link b linking spine device 1 to leaf device 2. In relation to the hardware design depicted in FIG. 2, an alternate interface is not needed. As shown, a packet issued from end node A is first processed by leaf device 1, which then forwards the packet on link a. In certain embodiments, leaf device 1 encapsulates the packet for transmission through network 303, which may be an overlay network. When spine device 1 receives the packet, it forwards the packet to leaf device 2, which processes the packet and delivers it to end node B. Leaf device 2 may deencapsulate the packet prior to forwarding it to end device B.

Figure 3B:
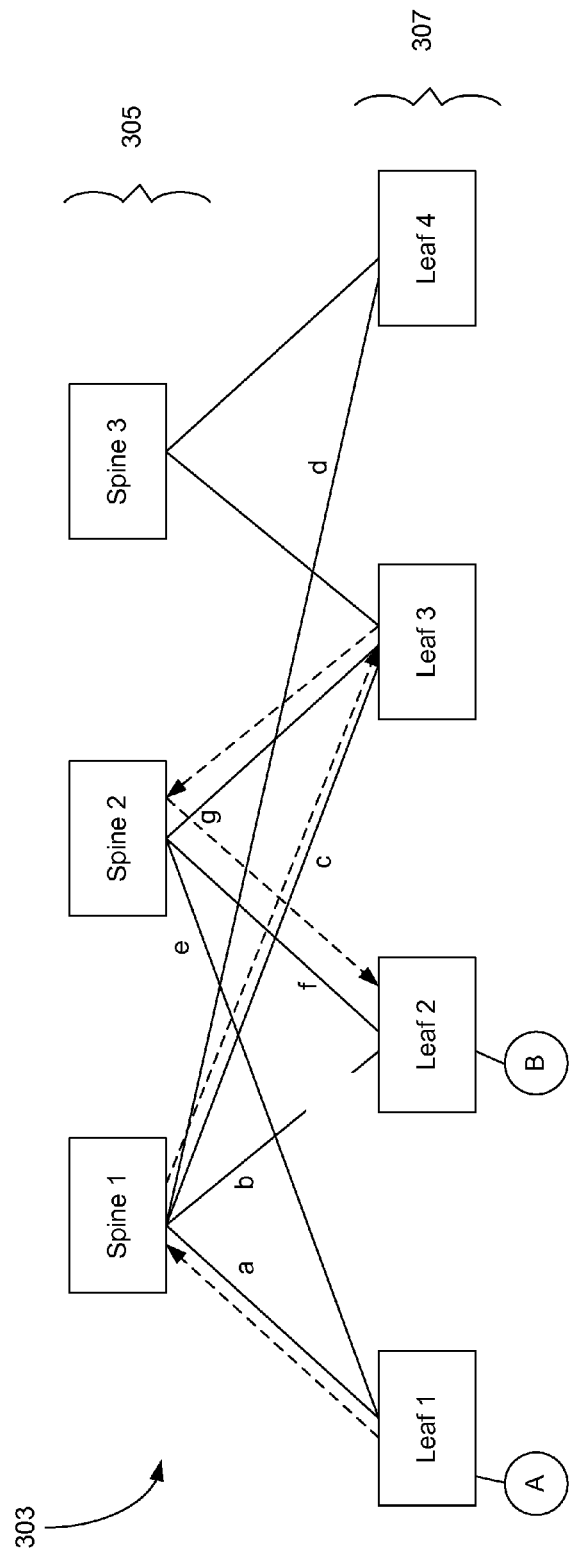
FIG. 3B shows the same network topology as FIG. 3A but with a failed link along the shortest path. In the depicted example, hardware rerouting works as intended and the packet reaches its destination (node B) with only one bounce.

In FIG. 3B, multi-rooted tree network 303 is again depicted. However in this case, link b has failed. In the depicted example, hardware rerouting works as intended, which means that the network device having the failed link selects an alternate interface for relaying a packet that ultimately finds its way to destination node B. As in FIG. 3A, leaf network device 1 receives a packet from its attached end device A and forwards the packet on link a to spine network device 1, which would normally, as depicted in FIG. 3A, forward the packet on to leaf network device 2 over link b. However, as shown in FIG. 3B, link b has failed. As a consequence, spine network device 1 uses its hardware rerouting functionality to identify an appropriate alternate link for the destination address associated with end device B. In this example, spine network device 1 chooses its interface to link c as the alternate interface for packets addressed to end device B (or leaf device 2). Thus, spine device 1 sends the packet on link c to leaf device 3, which receives a packet and recognizes that it should not send the packet back to spine device 1. The process by which leaf device 3 recognizes this is described shortly. In the depicted example, leaf device 3 sends the packet to spine device 2 on a link g. Spine device 2 then forwards the packet to leaf device 2 on a link f. In this way, the packet is successfully rerouted around failed link b and relatively rapidly finds its way to leaf device 2 where it can be delivered to attached end device B. This process involved only one "bounce".

Figure 3C:
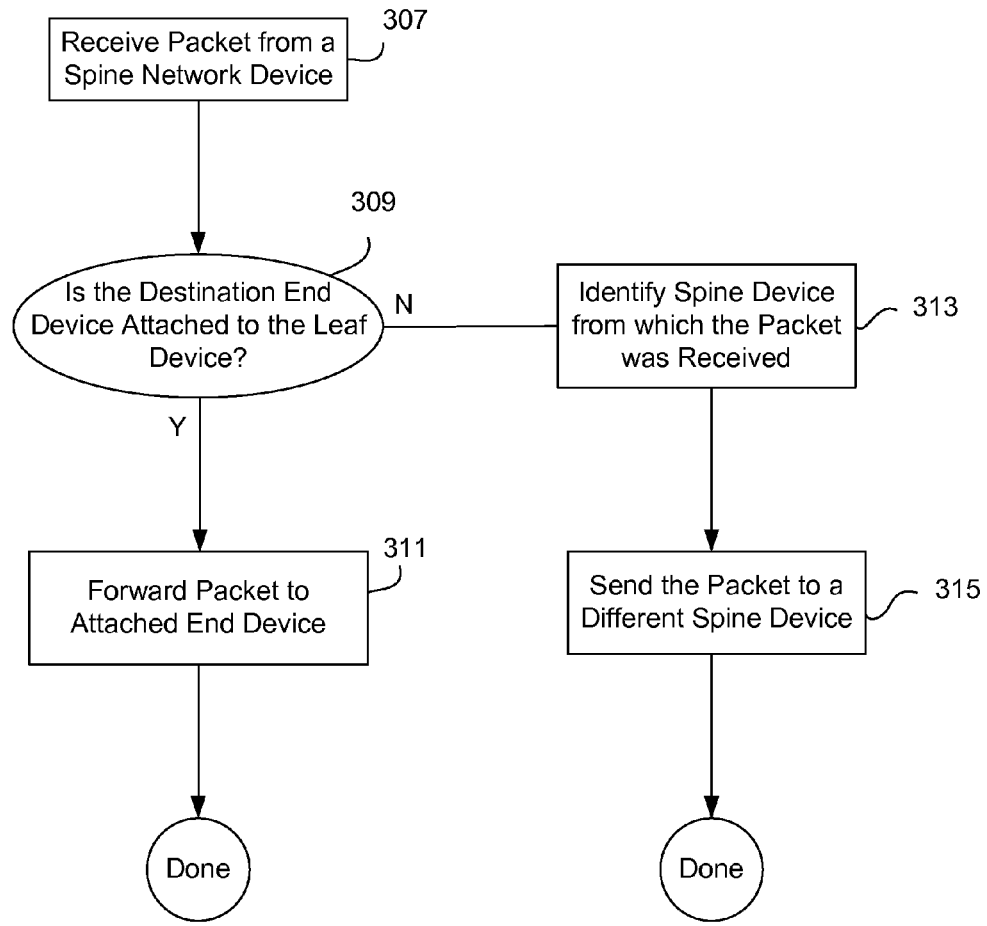
FIG. 3C is a process flow diagram depicting logic that may be implemented on a leaf network node to ensure that the leaf device does not send the packet right back to the spine network device that had forwarded the packet to the leaf network device.

As indicated, in the discussion of FIG. 3B, leaf device 3 is configured to not send the packet back to spine device 1. In certain implementations, this recognition is accomplished using a process such as that depicted in FIG. 3C, where a leaf network device receives a packet addressed to an end device on a different leaf device and determines not to send the packet back to the spine device that sent it. Even if the recipient leaf device employs routing functionality otherwise requiring that the packet should be sent to the spine device from which the packet was just received, the leaf device will not take this action. In other words, the leaf device will find an alternate spine device. One implementation of this logic is depicted in FIG. 3C. As shown there, the process begins at a block 307 where the leaf device receives a packet from a spine network device. Next, the leaf network device executing the process determines whether the destination address in the packet is for an end device attached to the leaf device. See decision block 309. If the destination address is for an attached device, the leaf network device simply forwards the packet to the attached and device as illustrated by block 311 and the process is concluded. If, however, the leaf network device determines that the destination address is for a device attached to a different leaf network device, the leaf processing the packet identifies the spine device from which the packet was received. See block 313. Using this information, the leaf device selects a different spine device for the next hop. Thus, as illustrated at a block 315, the leaf network device sends the packet to the different spine device and the process is concluded. Note that for an overlay network, the leaf device may simply determine whether it is the source address in the encapsulation when executing decision block 309.

Figure 3D:
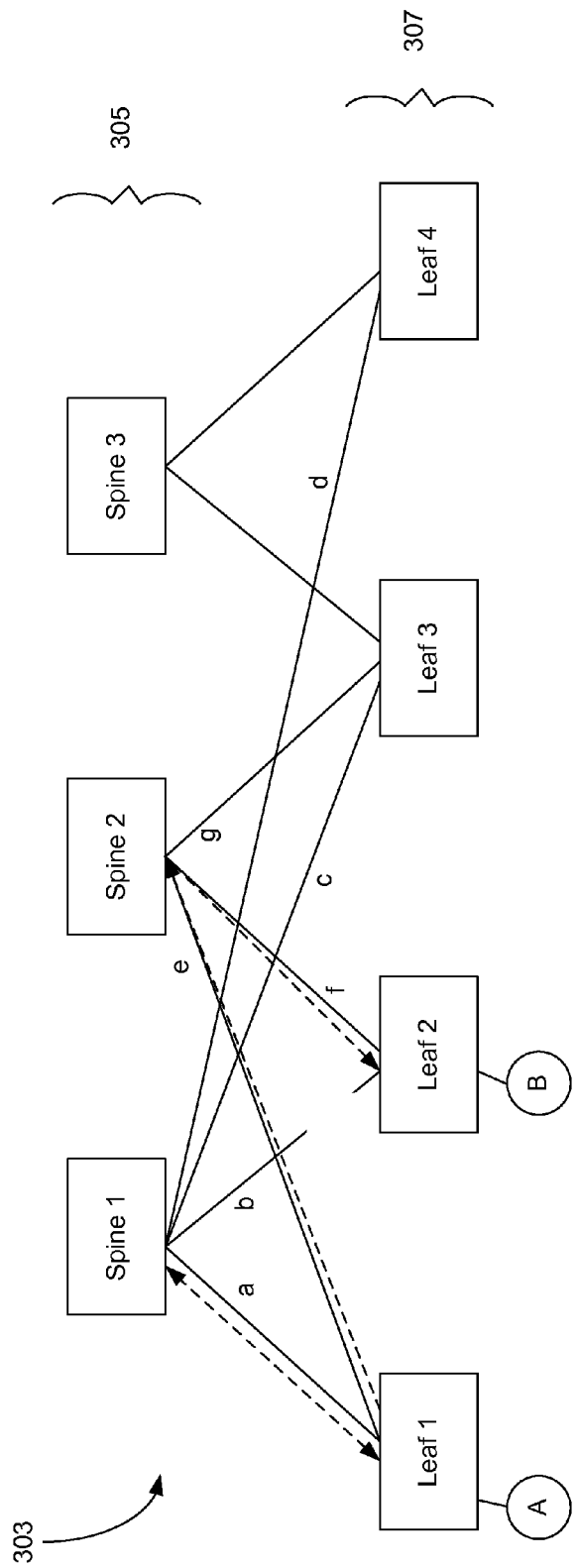
FIG. 3D shows the network topology of FIG. 3B—with a failed link on the shortest path between nodes A and B—in which a source leaf network device receives the packet back from a spine network device to which the leaf device had just forwarded the packet. In this example, the source's leaf network device corrects the problem by choosing a different spine network device to receive the packet in a second try.

FIG. 3D depicts a forwarding scenario in which link b as failed and spine network device 1 sends the packet back to leaf device 1. This is possible because spine device 1's forwarding logic may simply determine that leaf link 1 on link a is an appropriate alternate for failed link b. Upon receiving the packet from spine device 1, leaf device 1 determines that it should send the packet to a different spine device this time. It may make this determination using logic such as that depicted in FIG. 3C. In the depicted example of FIG. 3D, leaf device 1 decides on this second opportunity that it should send the packet on a link e to a spine network device 2. As shown, spine network device 2 receives the packet and then determines that it should forward the packet directly on to leaf network device 2 over a link f. In this manner, the packet is successfully routed from end device A to end device B with only one bounce.

Figure 3E:
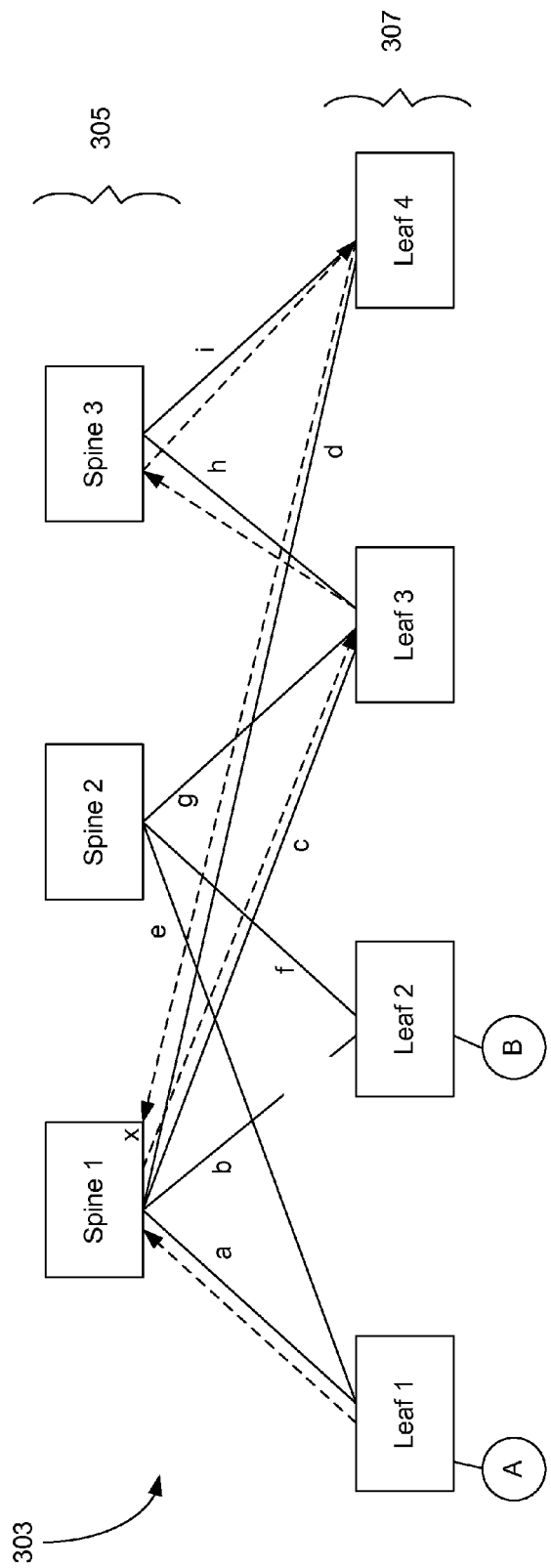
FIG. 3E shows a network topology as depicted in FIG. 3B, with a failed link on the shortest path. In the depicted example, the packet is dropped when it is sent to the same spine network device on two occasions.

In some implementations, the rerouting mechanism may be configured so that only one bounce or a limited number of bounces occurs. If more than a threshold number of such bounces occur, the packet may be dropped. Such process is illustrated in FIG. 3E, where link b has failed. Ultimately, the packet destined for end device B is dropped when it is routed to spine device 1 a second time. A mechanism for dropping a packet at an appropriate time may involve setting a rerouting flag as described further with reference to FIG. 3F.

In some embodiments, rerouting hardware marks every packet that is rerouted around a failure. If the packet returns to the router applying the mark and/or if the packet encounters more than a configurable number fast forward operations the packet is dropped. This indicates that there may be a loop.

In the example of FIG. 3E, spine device 1 receives the packet, recognizes that link b has failed, and chooses an alternate link, link c. In addition, to reduce the likelihood of loops, it flags the packet as rerouted before sending it toward leaf device 3 on link c. In this example, leaf device 3 recognizes that it should not send the packet back to spine device 1. However, leaf device 3 still has a choice of links g and h. In this example, its configuration chooses link h over link g and sends the packet on to spine device 3 over link h. Spine device 3 thereafter sends the packet on a link i to a leaf device 4, which, in turn, sends the packet back on to spine device 1 over a link d. Upon receiving the packet, and noting the reroute flag, spine device 1 recognizes the packet as being previously rerouted and drops it. The drop is shown by an "x" at an interface of spine device 1. In certain implementations, any time a spine device recognizes that one of its links has gone down and the spine device receives a packet flagged for rerouting, it drops the packet.

Figure 3F:
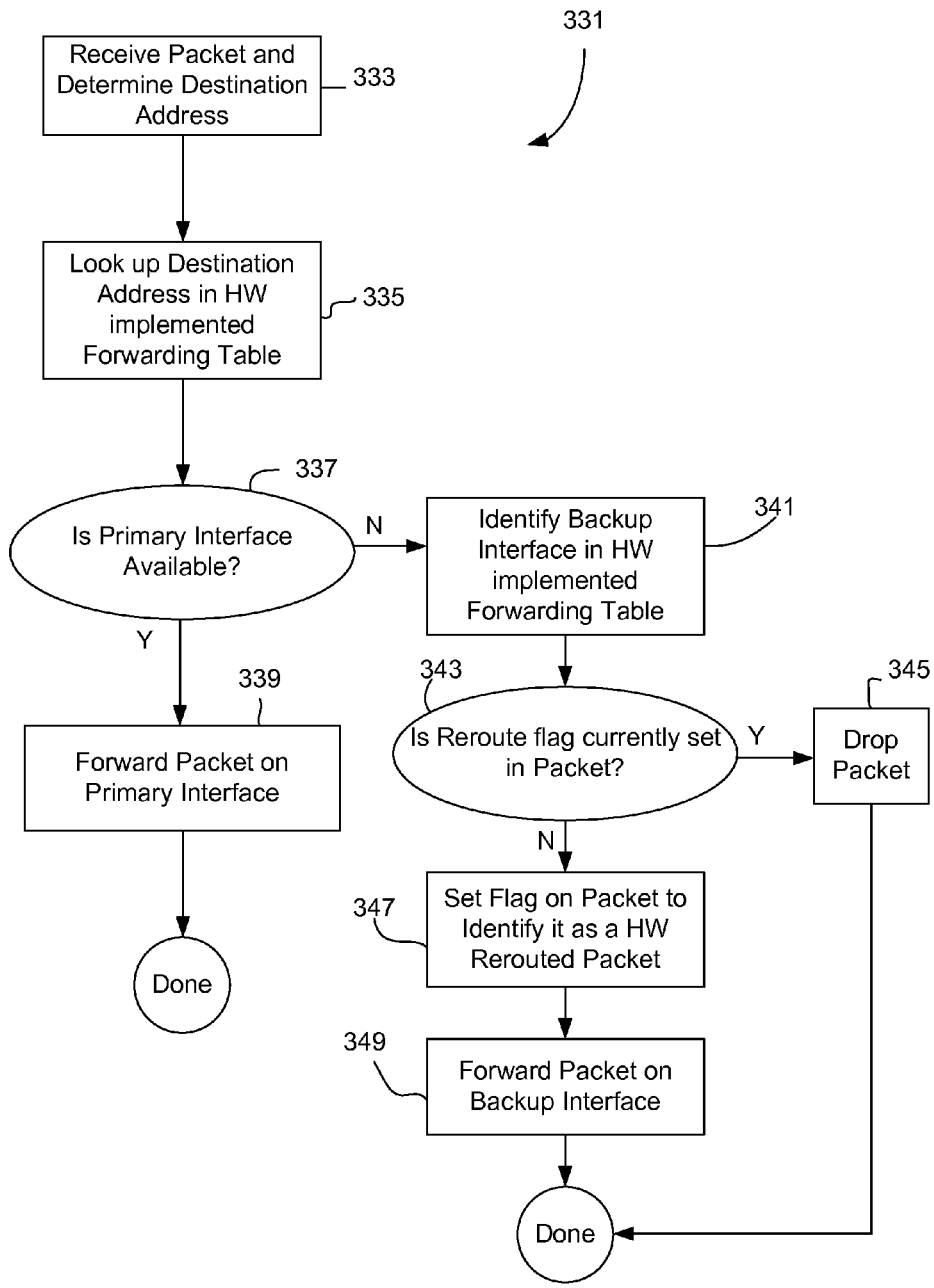
FIG. 3F is a process flow diagram showing logic implemented on the spine network device to ensure that the packet is dropped under the circumstances depicted in FIG. 3E.

An example of the process logic for dropping previously rerouted packets is depicted in FIG. 3F. As shown, a process 331 begins at a block 333 with a spine device receiving a packet and the spine device determining the destination address in the packet. Next, at a block 335, the spine device looks up the destination address using its hardware logic defined an interface for the address listed in that spine devices forwarding table. Thereafter, the spine device determines whether the primary interface identified in the forwarding tables available. See decision block 337. As indicated, the hardware will also know whether the link associated with the primary interfaces failed. If it is failed, the primary interface is not available. Assuming, that the primary interface is determined to be available at block 337, the spine network device then forwards the packet out on the primary interface as indicated at block 339, and the process is then concluded. Assuming alternatively that the primary interface is determined not be available, the spine network device then identifies an alternate interface using its hardware logic. See block 341. As explained, the alternate interface may be found in the forwarding table for the hardware implemented rerouting configuration. Thereafter, the spine network device determines whether a reroute flag is currently set in the packet. See decision block 343. If so, the network device simply drops the packet as indicated at a block 345 and the process is concluded. If, however, the reroute flag is not currently set, spine network device sets such flag on the packet to identify the packet is a rerouted packet. See block 347. Thereafter, the spine or device forwards the packet out on the alternate interface selected at block 341. See block 349. The process is then concluded.

A reroute flag may be set many different ways the packet. In a simple example, a single bit is designated as a reroute flag in the packet header. When that bit is set, spine devices recognize that the packet has been rerouted. Other labels may be applied to the packet to indicate rerouting.

Examples of Network Topologies

The disclosed embodiments may be implemented in one or more network devices within many different types of network topology. A few example network architectures will be described in further detail below.

In order to meet the demands of a worldwide user base, the modern datacenter may be composed of hundreds, thousands, or even tens of thousands of data servers. However, a large number of servers within a datacenter places a corresponding high demand on the datacenter's networking infrastructure. Network traffic taxing this infrastructure may represent communications between servers within the datacenter itself, or it may represent requests for information or services originating outside the datacenter, such as from client computers located throughout the worldwide internet (hereinafter just "internet"). With regards to the latter, the total number of servers in a datacenter is typically many times the total number of connections to the internet, and so the sharing of a limited number of internet connections between many servers is typically an important consideration.

"Access-Aggregation-Core" Network Architecture

Datacenter network design may follow a variety of topological paradigms—a given topology just referring to the system of networking lines/links which carry network traffic (i.e., data) and the networking switches, which control the flow of traffic over the lines/links in the network. One of the most common topological paradigms in use today is the aptly-named "access-aggregation-core" architecture. As the "core" part of the name suggests, such an architecture follows a hierarchical paradigm, wherein information traveling between hypothetical points A and B, first travel up the hierarchy away from point A and then back down the hierarchy towards point B.

Figure 4:
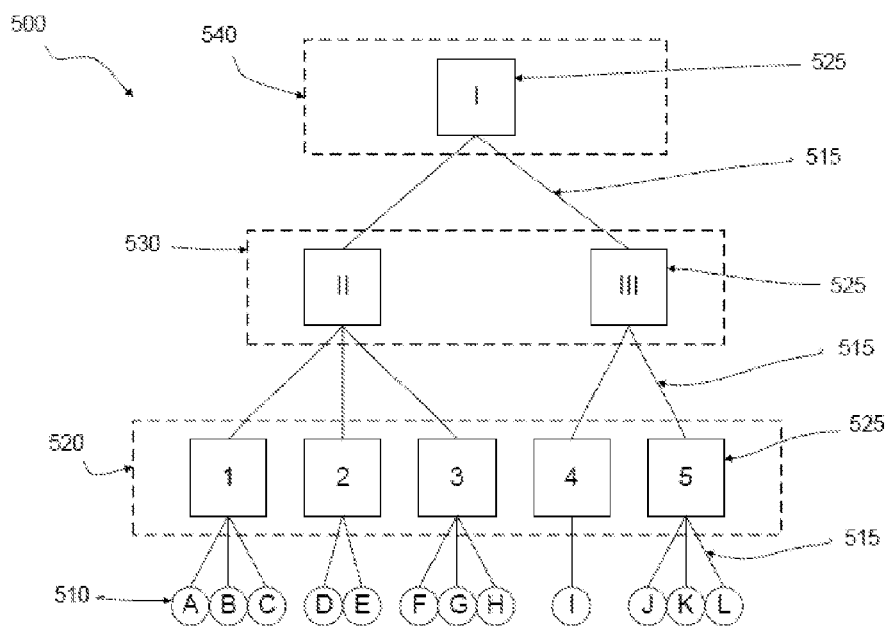

FIG. 4 schematically illustrates a simple network 500 made up of 12 "end devices" 510 (e.g., servers) which, following the "access-aggregation-core" (AAC) model, are connected through an access tier 520, an aggregation tier 530, and a top-level core tier 540. Within each tier are "network devices" 525 (e.g., ethernet switches) each of which controls flow of network traffic over various "links" 515 (e.g., ethernet cable) between it and the other network devices 525 and ultimately to and from end devices 510. As shown in FIG. 4, it is access tier 520 which provides each end device 510 with immediate access to the network. From there, traffic may pass to the aggregation tier 530, and then to the core tier 540, depending on its final destination. It is noted that for traffic whose final destination is within the network 500 shown in FIG. 4, how far up the hierarchy the traffic must be directed to reach this destination depends on the location of the destination within the network. Traffic whose final destination is outside the network shown in FIG. 4—e.g., to some server on the worldwide internet—will typically travel all the way up the hierarchy, since the connection or connections to the outside internet typically reside in the core tier. It is also noted that while FIG. 4 portrays each network device 525 identically for purposes of illustration, actual hardware implementations of such devices may possess substantial differences depending on whether the device is located in the access tier 520, the aggregation tier 530, or the core tier 540. For one thing, the single network device in the core tier 540 of FIG. 4 would typically route more traffic (for the reasons just described) than those network devices in the other layers, and so it's hardware would be chosen accordingly. Moreover, differing hardware implementations in one tier versus another may be dictated by whether the devices in each tier do bridging or routing, or both. For instance, the access tier typically does only bridging, the aggregation tier a combination of bridging and routing—bridging and routing between interfaces going to the access tier and routing to all others—and the core tier, only routing. Note that the term "end device" 510 refers to a device connected to the network which is identified on the network and uses the network to communicate with other devices connected to the network. As such, the end device 510 may be personal computer, a workstation, a server, or a device which may not be a computer per se such as, for example, a network printer, scanner, network storage device, etc. Also note that while a computer, server, workstation, etc. may be a physical device having one or more processors (each potentially having one or more cores) connected to an array of random-access memory (RAM) and possibly a non-volatile storage medium (such as a magnetic disc, flash drive, optical disc, magnetic tape, etc.), an end device 510 may also be a virtual device, such as a virtualized server running in a virtualization environment—such as VMWare—atop an actual physical server. Finally, it is also noted that in some embodiments, what is designated as an "end device," may actually refer to multiple computers, the distinction being that for purposes of network topology they share the same connection to the network and therefore operate substantially as a single networked unit.

FIG. 4 illustrates the hierarchal connectivity of an access-aggregation-core (AAC) network model and shows that, from core to end device, the architecture follows a tree structure or graph—meaning that each network device within the network is only connected to a single device above it in the hierarchy, but is potentially connected to multiple network devices below it. The tree structure also implies, as seen from the figure, that there is a single unique path—i.e., sequence of links—connecting any two end devices on the network. However, though each pair of end devices is connected by a unique path, paths between different pairs of end devices may, but not necessarily, use the same links along some portion of their route. For example, with regards to the specific network shown in FIG. 4, the end devices 510 labeled A and F (hereinafter "end device A" and so forth) communicate over a path through network devices 1, II, and then 3. Likewise end devices I and J communicate over a path through network devices 4, III, and then 5, and so these two paths do not overlap (i.e. the paths have no links in common). However, if end device A instead communicates with end device K (while I communicates with J), then both paths pass through network devices III and 5 (and the link adjoining devices III and 5).

"Leaf-Spine" Network Architecture

Another topology is often referred to as a "multi-rooted tree" topology (as opposed to a "tree"), which can be said to embody a full bi-partite graph if each spine network device is connected to each Leaf network device and vice versa. Networks based on this topology are oftentimes referred to as "Clos Networks," "flat networks," "multi-rooted networks," or just as "multi-rooted trees." In the disclosure that follows, a "leaf-spine" network architecture designed around the concept of a "multi-rooted tree" topology will be described. While it is true that real-world networks are unlikely to completely eliminate the "blocking" problem, the described "leaf-spine" network architecture, as well as others based on "multi-rooted tree" topologies, are designed so that blocking does not occur to the same extent as in traditional network architectures.

In analogy to microprocessor design where increased performance is realized through multi-core or multi-processor parallelization rather than simply by increasing processor clock speed, a leaf-spine network realizes higher performance, at least to a certain extent, by building the network "out" instead of building it "up" in a hierarchical fashion. Thus, a leaf-spine network in its basic form includes two-tiers, a spine tier and leaf tier. Network devices within the leaf tier·i.e. "leaf network devices"·provide connections to all the end devices, and network devices within the spine tier·i.e., "spine network devices"·provide connections among the leaf network devices. Note that in a prototypical leaf-spine network, leaf network devices do not directly communicate with each other, and the same is true of spine network devices. Moreover, in contrast to an AAC network, a leaf-spine network in its basic form has no third core tier connecting the network devices within the second tier to a much smaller number of core network device(s), typically configured in a redundant fashion, which then connect to the outside internet. Instead, the third tier core is absent and connection to the internet is provided through one of the leaf network devices, again effectively making the network less hierarchical. Notably, internet connectivity through a leaf network device avoids forming a traffic hotspot on the spine which would tend to bog down traffic not travelling to and from the outside internet.

It should be noted that very large leaf-spine networks may actually be formed from 3 tiers of network devices. As described in more detail below, in these configurations, the third tier may function as a "spine" which connects "leaves" formed from first and second tier network devices, but a 3-tier leaf-spine network still works very differently than a traditional AAC network due to the fact that it maintains the multi-rooted tree topology as well as other features. To present a simple example, the top tier of a 3-tier leaf-spine network still does not directly provide the internet connection(s), that still being provided through a leaf network device, as in a basic 2-tier leaf-spine network.

Figure 5:
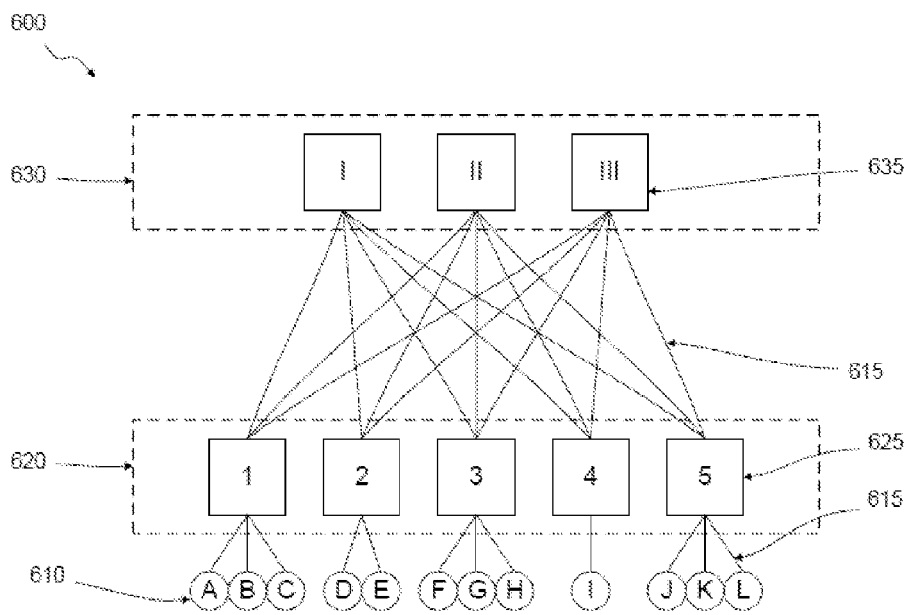

FIG. 5 schematically illustrates a particular example of a basic leaf-spine network 600. To a certain extent, network 600 is analogous (or is the counterpart of) the AAC network 500 shown in FIG. 4. Both provide connectivity for 12 end devices which directly connect to 5 network devices in a first tier, in the case of network 600, to the 5 leaf network devices 625 of leaf tier 620, which are analogous to the 5 network devices 525 of the access tier 520 of the AAC network 500. However, moving on to the second tier, unlike the AAC network 500 which has a 2-network device aggregation tier 530 and a 1-network device core tier 540, the leaf-spine network 600 employs just a single additional tier, the spine tier 630, which consists of 3 spine-network devices 635.

Though in FIGS. 4 and 5 the total number of network devices in the higher tiers remains the same, the connectivity of these devices is quite different. FIG. 5 shows that in a prototypical leaf-spine network, every leaf network device 625 is connected to multiple spine network devices 635 creating the so-called "multi-rooted tree" topology·differing from the ordinary tree topology of an AAC network where each network device is connected to only one network device above it in the hierarchy. As a consequence and unlike an AAC network, in a leaf-spine network there are multiple paths of communication between any pair of leaf network devices 625, and thus also between any pair of end devices 610 connected to different leaf network devices. The multi-path topology which joins the end devices in these networks is a characteristic which helps to reduce the extent to which "blocking" poses a problem. Moreover, leaf-spine networks are such that if a sufficient number of spine network devices are connected with sufficient bandwidth to the leaf network devices, a leaf-spine network may provide what is referred to as "full bisectional bandwidth," as described in more detail below. Furthermore, by adding additional tiers (such as a third tier as mentioned above and as described in greater detail below), a network of arbitrary size can be built that still provides "full bisectional bandwidth."

To illustrate, consider analogously to the example described above, communication between end device A and end device K simultaneous with communication between end devices I and J, which led to blocking in AAC network 500. As shown in FIG. 5, in the leaf-spine network 600, there are three paths connecting end device A with end device K and three different paths connecting end device I with end device J illustrating that no blocking problem arises. Again, assuming all links in the network provide equal bandwidth, the two pairs of end devices each have available 3 times the required bandwidth for max rate communication and thus the network is non-blocking in this scenario.

Example "Leaf-Spine" Network Architecture

The following describes an example implementation of a leaf-spine network architecture. It is to be understood, however, that the specific details presented here are for purposes of illustration only, and are not to be viewed in any manner as limiting the concepts disclosed herein. With this in mind, leaf-spine networks may be implemented as follows:

Leaf network devices may be implemented as ethernet switches having: (i) 48 ports for connecting up to 48 end devices (e.g., servers) at data transmission speeds of 10 GB/s (gigabits per second)—i.e. 'downlink ports'; and (ii) 12 ports for connecting to up to 12 spine network devices at data transmission speeds of 40 GB/s·i.e. 'uplink ports.' Thus, each leaf network device has 480 GB/s total bandwidth available for server connections and an equivalent 480 GB/s total bandwidth available for connections to the spine tier. More generally, leaf network devices may be chosen to have a number of ports in the range of 10 to 50 ports, or 20 to 100 ports, or 50 to 1000 ports, or 100 to 2000 ports, wherein some fraction of the total number of ports are used to connect end devices (downlink ports') and some fraction are used to connect to spine network devices (uplink ports'). In some embodiments, the ratio of uplink to downlink ports of a leaf network device may be 1:1, or 1:2, or 1:4, or the aforementioned ratio may be in the range of 1:1 to 1:20, or 1:1 to 1:10, or 1:1 to 1:5, or 1:2 to 1:5. Likewise, the uplink ports for connection to the spine tier may have the same bandwidth as the downlink ports used for end device connection, or they may have different bandwidths, and in some embodiments, higher bandwidths. For instance, in some embodiments, uplink ports may have bandwidths which are in a range of 1 to 100 times, or 1 to 50 times, or 1 to 10 times, or 1 to 5 times, or 2 to 5 times the bandwidth of downlink ports. In the particular embodiment described above, the bandwidth of the uplink ports is 4 times the bandwidth of the downlink ports—e.g., downlink port data transmission speeds are 10 GB/s and uplink port data transmission speeds are 40 GB/s. Depending on the embodiment, the downlink data transmission speed may be selected to be 10 MB/s (megabit/second), 100 MB/s, 1 GB/s (gigabit/second), 10 GB/s, 40 GB/s, 100 GB/s, 1 TB/s (terabit/second), and the corresponding uplink port data transmission speed may be chosen according to the foregoing proportions (of uplink to downlink port transmission speeds). Likewise, depending on the embodiment, the downlink data transmission speed may be selected from within a range of between about 10 MB/s and 1 TB/s, or between about 1 GB/s and 100 GB/s, or between about 10 GB/s and 40 GB/s, and the corresponding uplink port data transmission speed may also be chosen according to the previously described proportions (of uplink to downlink port transmission speeds).

Moreover, depending on the embodiment, leaf network devices may be switches having a fixed number of ports, or they may be modular, wherein the number of ports in a leaf network device may be increased by adding additional modules. The leaf network device just described having 48 10 GB/s downlink ports (for end device connection) and 12 40 GB/s uplink ports (for spine tier connection) may be a fixed-sized switch, and is sometimes referred to as a 'Top-of-Rack' switch. Fixed-sized switches having a larger number of ports are also possible, however, typically ranging in size from 48 to 150 ports, or more specifically from 48 to 100 ports, and may or may not have additional uplink ports (for communication to the spine tier) potentially of higher bandwidth than the downlink ports. In modular leaf network devices, the number of ports obviously depends on how many modules are employed. In some embodiments, ports are added via multi-port line cards in similar manner to that described below with regards to modular spine network devices.

Spine network devices may be implemented as ethernet switches having 576 ports for connecting with up to 576 leaf network devices at data transmission speeds of 40 GB/s. More generally, spine network devices may be chosen to have a number of ports for leaf network device connections in the range of 10 to 50 ports, or 20 to 100 ports, or 50 to 1000 ports, or 100 to 2000 ports. In some embodiments, ports may be added to a spine network device in modular fashion. For example, a module for adding ports to a spine network device may contain a number of ports in a range of 10 to 50 ports, or 20 to 100 ports. In this manner, the number of ports in the spine network devices of a growing network may be increased as needed by adding line cards, each providing some number of ports. Thus, for example, a 36-port spine network device could be assembled from a single 36-port line card, a 72-port spine network device from two 36-port line cards, a 108-port spine network device from a trio of 36-port line cards, a 576-port spine network device could be assembled from 16 36-port line cards, and so on.

Links between the spine and leaf tiers may be implemented as 40 GB/s-capable ethernet cable (such as appropriate fiber optic cable) or the like, and server links to the leaf tier may be implemented as 10 GB/s-capable ethernet cable or the like. More generally, links, e.g. cables, for connecting spine network devices to leaf network devices may have bandwidths which are in a range of 1 GB/s to 1000

GB/s, or 10 GB/s to 100 GB/s, or 20 GB/s to 50 GB/s. Likewise, links, e.g. cables, for connecting leaf network devices to end devices may have bandwidths which are in a range of 10 MB/s to 100 GB/s, or 1 GB/s to 50 GB/s, or 5 GB/s to 20 GB/s. In some embodiments, as indicated above, links, e.g. cables, between leaf network devices and spine network devices may have higher bandwidth than links, e.g. cable, between leaf network devices and end devices. For instance, in some embodiments, links, e.g. cables, for connecting leaf network devices to spine network devices may have bandwidths which are in a range of 1 to 100 times, or 1 to 50 times, or 1 to 10 times, or 1 to 5 times, or 2 to 5 times the bandwidth of links, e.g. cables, used to connect leaf network devices to end devices.

In the particular example of each spine network device implemented as a 576-port @ 40 GB/s switch and each leaf network device implemented as a 48-port @ 10 GB/s downlink & 12-port @ 40 GB/s uplink switch, the network can have up to 576 leaf network devices each of which can connect up to 48 servers, and so the leaf-spine network architecture can support up to 576·48=27,648 servers. And, in this particular example, due to the maximum leaf-to-spine transmission rate (of 40 GB/s) being 4 times that of the maximum leaf-to-server transmission rate (of 10 GB/s), such a network having 12 spine network devices is fully non-blocking and has full cross-sectional bandwidth.

As described above, the network architect can balance cost with oversubscription by adjusting the number of spine network devices. In this example, a setup employing 576-port switches as spine network devices may typically employ 4 spine network devices which, in a network of 576 leaf network devices, corresponds to an oversubscription rate of 3:1. Adding a set of 4 more 576-port spine network devices changes the oversubscription rate to 3:2, and so forth.

Datacenters typically consist of servers mounted in racks. Thus, in a typical setup, one leaf network device, such as the 'Top-of-Rack' device described above, can be placed in each rack providing connectivity for up to 48 rack-mounted servers. The total network then may consist of up to 576 of these racks connected via their leaf-network devices to a spine-tier rack containing between 4 and 12 576-port spine tier devices.

Leaf-Spine Network Architectures Formed from More than Two Tiers of Network Devices The two-tier leaf-spine network architecture described above having 576-port @ 40 GB/s switches as spine network devices and 48-port @ 10 GB/s downlink & 12-port @ 40 GB/s uplink switches as leaf network devices can support a network of up to 27,648 servers, and while this may be adequate for most datacenters, it may not be adequate for all. Even larger networks can be created by employing spine tier devices with more than 576 ports accompanied by a corresponding increased number of leaf tier devices. However, another mechanism for assembling a larger network is to employ a multi-rooted tree topology built from more than two tiers of network devices—e.g., forming the network from 3 tiers of network devices, or from 4 tiers of network devices, etc.

One simple example of a 3-tier leaf-spine network may be built from just 4-port switches and this is schematically illustrated in FIGS. 6A-1, 6A-2, and 6B, in order to convey the general principle. Of course, it is to be understood that to build a large 3-tier network, larger switches would be employed. FIG. 6A-1 shows 4 4-port switches 722 (labeled "1-1," "1-2," "1-3," "1-4") connected to form a 2-tier leaf-spine network 701 for connecting 4 end devices 710 (labeled "A," "B," "C," "D") with switches 1-1 and 1-2 serving as leaf network devices, and switches 1-3 and 1-4 serving as spine network devices. Note that a leaf-spine network assembled from 4-port switches would generally support a network of 8 end devices 710, connected through 2 spine-network devices and 4 leaf network devices, but here, half the ports on the switches serving as spine network devices, switches 1-3 and 1-4, have their links pointed upward in FIG. 6A-1 to schematically indicate these links are reserved for uplink connection to a third tier. With the 4 4-port switches 722 connected in this manner, they may collectively be viewed as functioning as an 8 port switch 725, as schematically illustrated in FIG. 6A-2 (and labeled "1"), with 4 downlinks 705 to potential end devices 710 and 4 uplinks 715 to a potential third tier. Such an effective 8-port switch may then serve as a building-block for a 3-tier leaf-spine network.

FIG. 6B then shows how a 3-tier leaf-spine network 702 may be assembled from these 8-port building blocks. As shown in the figure, 4 8-port building blocks 725 may effectively serve as 4 leaf-network devices (labeled "1," "2," "3," "4,") in the leaf tier 720 of network 702. The spine tier 730 of network 702 is formed from 4 additional 4-port switches 735 (labeled "I," "II," "III," "IV"), similar to those used to form each 8-port leaf network device 725. Thus, when viewed in terms of 4-port switches, network 702 consists of 3 tiers with 8 4-port switches in the bottom tier, 8 4-port switches in the middle tier, and 4 4-port switches in the top tier, though this network may still be viewed as having a leaf tier 720 and spine tier 730, as just described. It is seen in the figure, that network 702 may connect up to 16 end devices 710. Generalizing this, it is noted that a 3-tier leaf-spine network may connect a total number of end devices equal to $\frac{1}{4} \cdot l \cdot m \cdot n$, where l, m, and n are the number of ports in the devices forming the top, middle, and bottom tiers, respectively (e.g., in FIG. 6B, $\frac{1}{4} \cdot 4 \cdot 4 \cdot 4 = 16$). Thus, if n-port devices are used to build a network, the size of a 3-tier leaf-spine network scales as approximately $n^3$, whereas the size of a 2-tier leaf-spine network scales only as $n^2$. Accordingly, leaf-spine network architectures employing 3 tiers of network devices open up the possibility of efficiently assembling even larger networks.

The disclosed embodiments may be implemented in one or more network devices within a network such as that described herein. Within a leaf-spine network, the disclosed embodiments may be implemented in one or more leaf network devices and/or one or more spine network devices within one or more spine tiers.

Example Network Device

Figure 7:
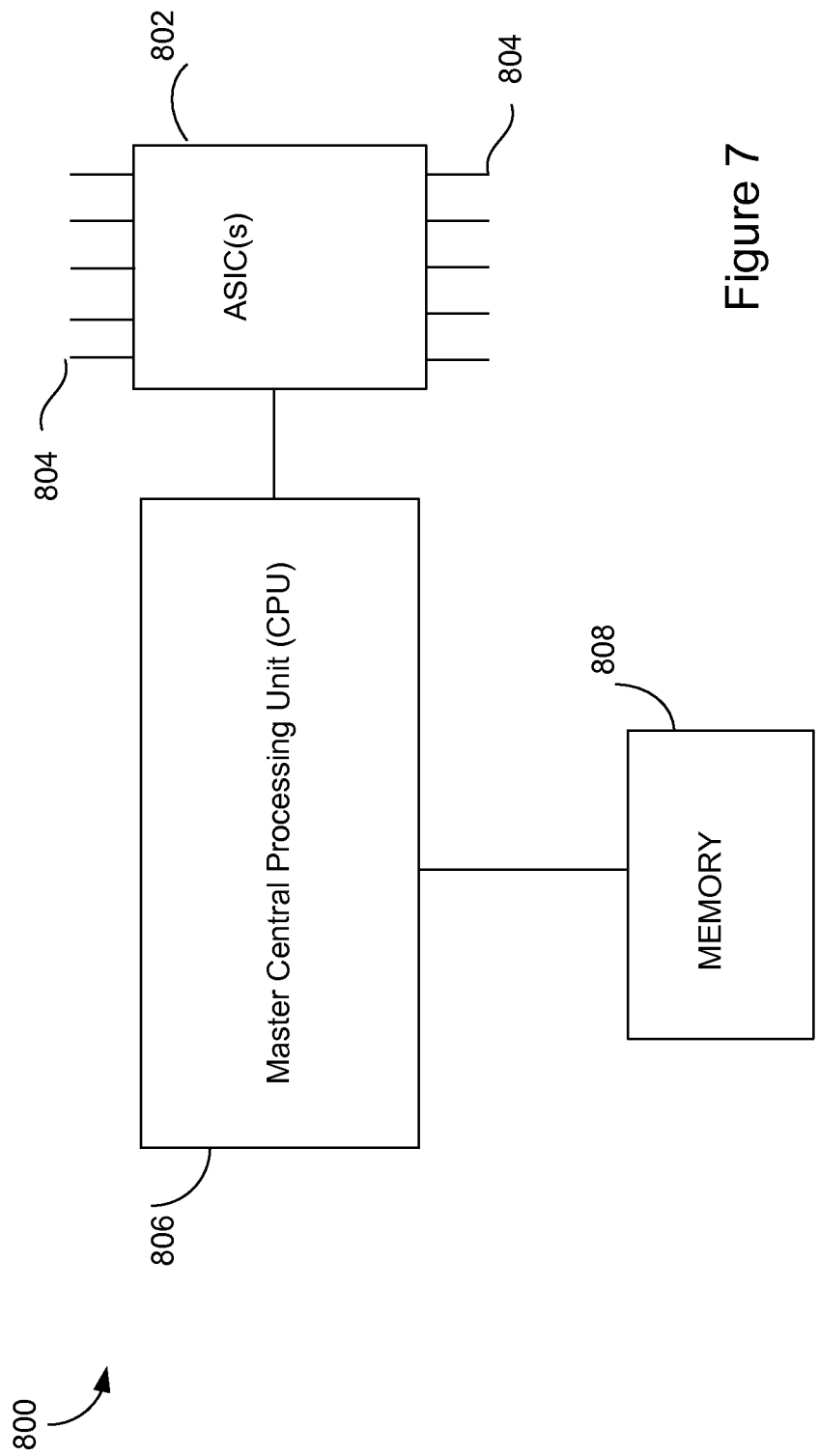
FIG. 7 is a high level diagram of a network device architecture.

FIG. 7 illustrates an example of a network device that may be configured to implement various embodiments. Network device 800 may include one or more hardware processors such as Application Specific Integrated Circuits (ASICs) 802. The ASICs 802 may have interfaces 804, which may include ports appropriate for communication with the appropriate media and protocols. The ASICs 802 may perform at least some of the functions of the logic described herein. In addition, a master central processing unit (CPU) 806 may perform other functions such as routing computations, network diagnostics, security functions, etc.

The interfaces 804 are typically provided as interface cards (not shown to simplify illustration), which may be referred to as "line cards". Generally, the interfaces 804 control the sending and receiving of packets over the network and may also support other peripherals used with the network device 800. The communication path between interfaces/line cards may be bus based or switch fabric based (such as a cross-bar). Among the interfaces that may be provided are Fibre Channel ("FC") interfaces, Ethernet interfaces, frame relay interfaces, cable interfaces, Digital Subscriber Line (DSL) interfaces, token ring interfaces, and the like. In addition, various very high-speed interfaces may be provided, such as fast Ethernet interfaces, Gigabit Ethernet interfaces, Asynchronous Transfer Mode (ATM) interfaces, High-Speed Serial Interfaces (HSSI), Packet over Sonet (POS) interfaces, Fiber Distributed Data Interfaces (FDDI), Asynchronous Serial Interfaces (ASI)s, DigiCable Headend Expansion Interfaces (DHEI), and the like.

When acting under the control of the ASICs 802, in some implementations of the invention the CPU 806 may be responsible for implementing specific functions associated with the functions of a desired network device. According to some embodiments, CPU 806 accomplishes all these functions under the control of software including an operating system and any appropriate applications software.

The CPU 806 may include one or more processors or specially designed hardware for controlling the operations of the network device 800. The CPU 806 may also include memory such as non-volatile RAM and/or ROM, which may be used for a variety of purposes such as, for example, caching and/or storing data, programming instructions, etc. However, there are many different ways in which memory could be coupled to the system.

Regardless of the network device's configuration, it may employ one or more memories or memory modules (such as, for example, memory block 806) configured to store data such as network graphs and forwarding tables, program instructions for the general-purpose network operations and/or other information relating to the functionality of the techniques described herein. For example, the memory block 806 may correspond to a random access memory (RAM) or content addressable memory such as TCAM. The program instructions may control the operation of an operating system and/or one or more applications, for example. Because such information and program instructions may be employed to implement the systems/methods described herein, the disclosed embodiments relate to machine-readable media that include program instructions, state information, etc. for performing various operations described herein. Examples of machine-readable media include, but are not limited to, magnetic media such as hard disks and magnetic tape; optical media such as CD-ROM disks; magneto-optical media; and hardware devices that are specially configured to store and perform program instructions, such as read-only memory devices (ROM) and random access memory (RAM). Examples of program instructions include both machine code, such as produced by a compiler, and files containing higher level code that may be executed by the computer using an interpreter.

Although the network device shown in FIG. 7 illustrates one specific network device, it is by no means the only network device architecture on which the disclosed embodiments can be implemented. For example, although a single ASIC is shown in FIG. 7, an architecture having two or more ASICs may also be implemented.

Although illustrative embodiments and applications of the disclosed embodiments are shown and described herein, many variations and modifications are possible which remain within the concept, scope, and spirit of the disclosed embodiments, and these variations would become clear to those of ordinary skill in the art after perusal of this application. Moreover, the disclosed embodiments need not be performed using the steps described above. Accordingly, the present embodiments are to be considered as illustrative and not restrictive, and the disclosed embodiments are not to be limited to the details given herein, but may be modified within the scope and equivalents of the appended claims.

What is claimed is:

1. A network device comprising:
   (a) a plurality of interfaces for coupling with network links; and
   (b) a processor with hardware logic configured to
      determine that a link to one of the plurality of interfaces of the network device is not functioning properly,
      look up, in a forwarding table, interfaces of the network device for reaching network addresses, the forwarding table containing, for each of one or more network addresses, a primary interface of the plurality of interfaces and one or more alternate interfaces of the plurality of interfaces, and
      upon determining that the primary interface of the network device for reaching a network address is coupled to the link identified as not functioning properly, identify, in the forwarding table, one of the alternate interfaces for reaching the network address.

2. The network device of claim 1, wherein the processor is an application specific integrated circuit.

3. The network device of claim 1, where in the processor is a digital signal processor.

4. The network device of claim 1, further comprising memory on the processor, wherein the memory is configured to store the forwarding table.

5. The network device of claim 4, where in the memory is content addressable memory.

6. The network device of claim 1, wherein the hardware logic is further configured to determine whether a packet identified for forwarding on an alternate interface listed in the forwarding table has a reroute flag set, and, if so, dropping said packet.

7. The network device of claim 6, wherein the hardware logic is further configured to set said reroute flag in the packet when the packet does not have a previously set reroute flag.

8. The network device of claim 1, wherein the hardware logic is further configured to
   instruct the network device to send a packet on said alternate interface;
   determine that the packet does not have a reroute flag set; and
   set said reroute flag in the packet.

9. The network device of claim 1, wherein said network device is configured as a spine node on a network having a multi-rooted tree topology.

10. The network device of claim 9, further comprising program logic configured to encapsulate and de-encapsulate packets sent on an overlay of the network.

11. The network device of claim 10, further comprising program logic for processing VxLAN encapsulation.

12. The network device of claim 1, wherein the hardware logic is further configured to reroute a packet, in response to a detected link failure, on an alternate interface within a period of about 1 millisecond or less.

13. The network device of claim 1, further comprising software configured to (i) maintain an updated graph of a network containing the network device, and (ii) recalculate entries for the forwarding table from said graph.

14. The network device of claim 13, wherein the software is further configured to send control packets to other network devices, wherein said control packets contain reachability information consistent with one or more failed links on the network device.

15. The network device of claim 13, wherein the hardware logic is configured to reroute a packet on an alternate interface before the software updates the graph and/or recalculates entries for the forwarding table in response to a detected link failure.

16. The network device of claim 1, wherein the hardware logic is configured to determine, look up, and identify as recited in claim 1 without any software intervention.

17. The network of claim 1, wherein a spine network device further comprises software configured to (i) maintain an updated graph of a network containing the network device, and (ii) recalculate entries for the forwarding table from said graph.

18. The network of claim 17, wherein the software is further configured to send control packets to other network devices, wherein said control packets contain reachability information indicating consistent with one or more failed links.

19. The network of claim 18, wherein the hardware logic of the spine network device is configured to reroute a packet on an alternate interface before the software updates the graph and/or recalculates entries for the forwarding table in response to a detected link failure.

20. A network comprising a plurality of leaf and spine network devices connected in a multi-rooted tree topology, wherein each of at least some of the spine network devices comprises:
  a plurality of interfaces for coupling with network links; and
  a processor with hardware logic configured to
    determine that a link to one of the plurality of interfaces is not functioning properly,
    look up, in a forwarding table, interfaces for reaching network addresses, the forwarding table containing, for each of one or more network addresses, a primary interface of the plurality of interfaces and one or more alternate interfaces of the plurality of interfaces, and
    identify in the forwarding table, one of the alternate interfaces for reaching a network address after the primary interface for said network address coupled to the link is identified as not functioning properly; and
  wherein each of the leaf network devices comprise:
    a plurality of interfaces for coupling with spine network devices and end devices.

21. The network of claim 20, wherein the leaf network devices further comprise logic configured to
  determine whether a packet is addressed to the leaf network device or to an end device attached to the leaf network device, and
  if not, forward the packet to a spine network device that is not the spine network device that sent the packet to the leaf network device.

22. The network of claim 20, wherein the processor of a spine network device is an application specific integrated circuit.

23. The network of claim 20, wherein the processor of a spine network device further comprises memory configured to store the forwarding table.

24. The network of claim 23, where in the memory is content addressable memory.

25. The network of claim 20, where in the hardware logic of a spine network device is further configured to determine whether a packet identified for forwarding on an alternate interface listed in the forwarding table has a reroute flag set, and, if so, dropping said packet.

26. The network of claim 25, wherein the hardware logic is further configured to set said reroute flag in the packet when the packet does not have a previously set reroute flag.

27. The network of claim 20, wherein a spine network device further comprises program logic configured to encapsulate and de-encapsulate packets sent on an overlay of the network.

28. The network of claim 27, wherein the spine network device further comprises program logic for processing VxLAN encapsulation.

29. A method of rerouting a packet when a link to a network device has failed, the network device comprising a plurality of interfaces for coupling with network links, and a processor with hardware logic, the method comprising:
  (a) determining, by the network device, that a link to one of the plurality of interfaces of the network device is not functioning properly,
  (b) looking up interfaces for reaching network addresses in a forwarding table containing, for each of one or more network addresses, a primary interface of the plurality of interfaces and one or more alternate interfaces of the plurality of interfaces, and
  (c) identifying in the forwarding table one of the alternate interfaces for reaching a network address upon determining that the primary interface for said network address is coupled to the link identified as not functioning properly,
  wherein at least (b) and (c) are performed by the hardware logic.

30. The method of claim 29, wherein the processor is an application specific integrated circuit.

31. The method claim 29, where in the processor is a digital signal processor.

32. The method of claim 29, further comprising memory on the processor, wherein the memory is configured to store the forwarding table.

33. The method of claim 32, where in the memory is content addressable memory.

34. The method of claim 29, further comprising determining whether a packet identified for forwarding on an alternate interface listed in the forwarding table has a reroute flag set, and, if so, dropping said packet.

35. The method of claim 34, further comprising setting said reroute flag in the packet when the packet does not have a previously set reroute flag.

36. The method of claim 29, further comprising:
  instructing the network device to send a packet on said alternate interface;
  determining that the packet does not have a reroute flag set; and
  setting said reroute flag in the packet.

37. The method of claim 29, wherein said network device is configured as a spine node on a network having a multi-rooted tree topology.

38. The method of claim 37, further comprising encapsulating and de-encapsulating packets sent on an overlay of the network.

39. The method of claim 38, further comprising processing VxLAN encapsulation.

40. The method of claim 29, further comprising rerouting a packet, in response to a detected link failure, on an alternate interface within a period of about 1 millisecond or less.

41. The method of claim 29, further comprising: (i) maintaining an updated graph of a network containing the network device, and (ii) recalculating entries for the forwarding table from said graph.

42. The method of claim 41, further comprising sending control packets to other network devices, wherein said control packets contain reachability information consistent with one or more failed links on the network device.

43. The method of claim 41, further comprising rerouting a packet on an alternate interface before the network device updates the graph and/or recalculates entries for the forwarding table in response to a detected link failure.

44. The method of claim 29, wherein the hardware logic is configured to determine, look up, and identify as recited in claim 29 without any software intervention.

\* \* \* \* \*